United States Patent

Yamawaki et al.

[11] Patent Number: 6,133,997
[45] Date of Patent: Oct. 17, 2000

[54] SYSTEM FOR SPOTTING MOVING OBJECTS BASED ON A PLURALITY OF ARTIFICIAL SATELLITES

[75] Inventors: Koji Yamawaki, Ryugasaki; Yasuhiro Takami, Tsukuba; Yoko Nishio, Takasaki; Yutaka Kaneko, Moriya-machi; Takahiro Kinoshita, Tsukuba, all of Japan

[73] Assignee: National Space Development Agency of Japan, Tokyo, Japan

[21] Appl. No.: 09/272,616

[22] Filed: Mar. 19, 1999

[30] Foreign Application Priority Data

Mar. 23, 1998 [JP] Japan .................................... 10-092207

[51] Int. Cl.[7] ........................... G01B 11/26; C01C 21/02; C01C 21/00; C01C 9/00
[52] U.S. Cl. ................................. 356/139.01; 250/203.3; 701/222; 701/226; 702/152
[58] Field of Search ..................................... 701/222, 226; 702/152; 356/139.01; 250/203.3

[56] References Cited

U.S. PATENT DOCUMENTS

| | | | |
|---|---|---|---|
| 5,512,743 | 4/1996 | Shaffer et al. | 250/203.6 |
| 5,745,869 | 4/1998 | Bezooijen | 701/222 |
| 6,008,492 | 12/1999 | Slater et al. | 250/334 |

*Primary Examiner*—Stephen C. Buczinski
*Attorney, Agent, or Firm*—Armstrong, Westerman, Hattori, McLeland & Naughton

[57] ABSTRACT

A system for spotting moving objects based on a plurality of artificial satellites including: a step of taking images at the same point in time by using imaging devices respectively mounted on at least two units of artificial satellites located separately from one another of which the positions can be defined at every moment in time; a step of discriminating a large number of stars at infinity and a small number of moving objects located near the earth through a synthetic processing by superimposing upon one another at least two images of spots obtained from the image taking at the respective satellites; and a step of specifying the positions of the discriminated moving objects from data of images forming positions of the moving objects on the basis of the large number of stars at infinity.

4 Claims, 4 Drawing Sheets

SYSTEM FOR SPOTTING MOVING OBJECTS BASED ON A PLURALITY OF ARTIFICIAL SATELLITES

BACKGROUND OF THE INVENTION

1. Field of the Invention

The present invention relates to system for spotting moving objects based on a plurality of satellites in which the position of moving objects dispersedly existing in space near the earth can be determined in real time by using imaging devices respectively mounted on a plurality of artificial satellites in orbit near the earth.

2. Description of the Related Art

In general, observation of moving objects orbiting in space near the earth is customarily performed by using an optical telescope or radar which is located on the earth. In observation by optical telescopes, a light spot not of a fixed star is extracted from images observed by these and its relative position is deduced with respect to the fixed stars. It is tracked for a certain time span to determine the orbit of the moving object. In observation by a radar, the pointing direction of an antenna and the range to a moving object are measured for a certain time span by receiving a reflected wave of transmitted radio waves, thereby determining the orbit of the moving object.

In observation by optical telescopes, however, in addition to the fact that an observation period is limited to during nighttime, the accuracy in observing the position of light spots is restricted due to scattering and/or refraction through the air. Also, since there are limits on the performance of imaging devices, the dimensions and/or clearance of observable objects are also limited.

In observation by radar, on the other hand, though an observation period is not limited to during nighttime, there are restrictions on the dimensions and/or clearance of observable objects similarly to the observation by optical telescope, in addition to the limits of the accuracy in determining the orbit of the moving object depending on the precision in detecting the angle of the antenna's attitude. It is necessary to increase transmitting power and to additionally increase the size of the antenna in order to achieve a higher observational performance, making readily imaginable its inherent limits in observation.

Further, of the above described two methods, the observation by optical telescope requires a massive data of fixed star distribution in order to instantly discriminate a moving object from the fixed stars. If collation with such data is not possible, a moving object can be specified only by continuing an uninterrupted observation for a certain time period so as to observe a change in the relative position between the moving object and the fixed stars. It is therefore readily imaginable that considerable observation time and costs are required for example for the task of specifying the orbits of space debris (generically referring to floating objects in space) which quite likely will be increased at an accelerated rate.

SUMMARY OF THE INVENTION

To eliminate the above problems in the conventional apparatus for observing moving objects orbiting in space near the earth, it is an object of the present invention to provide a system for spotting moving objects based on a plurality of artificial satellites in which the observation sensitivity is remarkably improved by eliminating the degradation and limitation in observational precision resulting from the attenuation in the quantity of light, scattering and refraction due the air and it is made possible to observe moving objects such as debris of the sizes impossible to be observed by the conventional observation apparatus and at the same time to efficiently determine the observed orbits of a large number of moving objects.

To solve the above problems, a system for spotting moving objects based on a plurality of artificial satellites is provided in accordance with a first aspect of the present invention, including: a step of taking images at the same point in time of space in substantially the same direction by using imaging devices respectively mounted on at least two units of artificial satellites located separately from one another of which the positions can be defined at every moment in time; a step of discriminating a large number of stars at infinity and a small number of moving objects located near the earth through a synthetic processing by superimposing upon one another at least two images of light spots obtained from the image taking at the respective satellites; and a step of specifying the positions of the discriminated moving objects from data of image forming position of the moving objects on the basis of the large number of stars at infinity.

In the system for spotting moving objects including these steps, points at which observation is made are provided at a plurality of satellites positioned at a suitable distance from one another for example at some distance where their lines of sight are crossed at an angle in degrees of several to teens when the direction of the point to be observed are viewed, for example, from two units of the satellites. On the plurality of images of light spots taken at the same time (simultaneously) by the imaging devices mounted on the respective satellites, an image can be formed of those light spots with an infinitesimal quantity of light of which observation from the earth is restricted. If the plurality of images of light spots observed from different points are compared with one another, an identical pattern (hereinafter referred to as fixed star pattern) is formed by the light spots of the fixed stars on the respective light spot images. The light spots of the moving objects near the earth (hereinafter referred to as moving light spots), however, are imaged as shifted to different positions with respect to the fixed star pattern on the respective light spot images. For this reason, the moving light spots without an overlap that are not of the fixed stars and are located near the earth can be discriminated through a synthesis of the plurality of light spot images where the respective fixed star patterns of the light spot images are caused to coincide upon one another. Accordingly, the position of the moving objects can be computed in real time from the data of the respective image forming positions with respect to the fixed star pattern of the moving light spots which do not cause an overlap on the respective light spot images.

The position of a moving object verified as the above described moving objects is computed from a geometric relationship between the light spot of the moving object and a reference fixed star pattern which is formed by representative stars (hereinafter referred to as reference fixed stars) distributed throughout the sky. In other words, if direction vectors in respect of the inertial space of reference stars which composes the reference fixed star pattern are known and if the angle between these direction vectors and the direction vector of the moving object is measured, the directional vector in respect of the inertial space of the moving object can be obtained. It should be noted that, in this case, it is necessary to previously provide the directional vectors of the reference fixed stars which constitute the reference fixed star pattern.

In taking of the light spot images as described above, it is not necessary to precisely determine the attitude of the satellites on which the above described imaging devices are mounted. A precise spotting of the moving objects is possible simply by precisely measuring the geometric relationship between the fixed star pattern and the moving light spot. Further, if stable attitudes with respect to the inertial space are to be maintained by the satellites, the geometric relationship of the light spots thereto can be more accurately measured by making longer the time duration of image taking. However, the above described plurality of satellites are required to have a means for transmitting imaged data or a means for processing data by receiving the transmitted imaged data for the synthesizing process as described above where the light spot images are superimposed upon one another.

A system for spotting moving objects based on a plurality of artificial satellites is provided in accordance with a second aspect of the present invention, including: a step of taking images at the same point in time of space in substantially the same direction for a plurality of different points in time by using imaging devices respectively mounted on at least two units of artificial satellites located separately from one another of which the positions can be defined at every moment in time; a step of discriminating a large number of stars at infinity and a small number of moving objects located near the earth through a synthetic processing of a plurality of light spot images obtained from the image taking at respective satellites; and a step of specifying the positions of the discriminated moving objects from data of image forming position of the moving objects on the basis of the large number of stars at infinity.

In the above described first aspect of the present invention, images of the skies in the same direction are taken from a plurality of artificial satellites located at different positions, thereby specifying the light spots shifted from a fixed star pattern as the moving objects that are not fixed stars and computing the position of the moving objects from the geometric relationship between the fixed star pattern and the light spots of the moving objects. Accordingly, since, in the above first aspect, it is necessary that images of identical fixed star patterns be taken, the imaging direction vectors of the imaging devices mounted on the respective satellites are generally in the same direction. For geometrical reasons, therefore, a problem of degraded precision in spotting occurs with the increase in distance to the moving object to be observed. In this case, position data (direction vectors) internally stored to each imaging device of a large number of fixed stars (hereinafter referred to as catalog fixed stars), possibly taken as an image throughout the sky, are used to generate fixed star patterns which would be required. Only the light spots in the vicinity of a space where a plurality of imaging direction vectors are crossed can then be extracted by identifying, for a plurality of light spot images, light spots that are not of catalog fixed stars. Mixed among such light spots are the fixed stars (hereinafter referred to as nonregistered fixed stars) that are not included in the catalog fixed stars and the light spots of the moving objects. The nonregistered fixed stars, however, do not move on a fixed star pattern. It is therefore possible to make a distinction between the light spot of a nonregistered fixed star and the light spot of a moving object by additionally taking a plurality of light spot images with providing an intervening time difference. The position of the moving object can be computed from the shift of the light spot of the moving object.

In the second aspect of the present invention, thus, the respective imaging devices mounted on the plurality of artificial satellites are used to simultaneously take images, respectively, of skies in substantially the same direction at a plurality of different points in time. The respective imaging direction vectors of the imaging devices are thereby adjusted in synchronization with each point in time at which images are taken. Accordingly, it is possible to improve the accuracy in spotting the moving objects within a three-dimensionally specified space to be observed.

In a third aspect of the present invention, of the system for spotting moving objects based on a plurality of artificial satellites according to the above first and second aspects, the plurality of artificial satellites are injected into substantially the same sun synchronous orbit with shifting the time of passing the ascending node so that space near the earth can be comprehensively observed under the same image taking environments.

A group of satellites thus injected side by side into sun synchronous orbits are capable of sequentially scanning to take images of space near orbits especially of low altitudes (for example an altitude of about 1,000 km). The space near the earth can be comprehensively observed and particular debris not detectable by an observation from the earth, for example, can be detected and spotted.

DESCRIPTION OF THE PREFERRED EMBODIMENT

Figure 1:
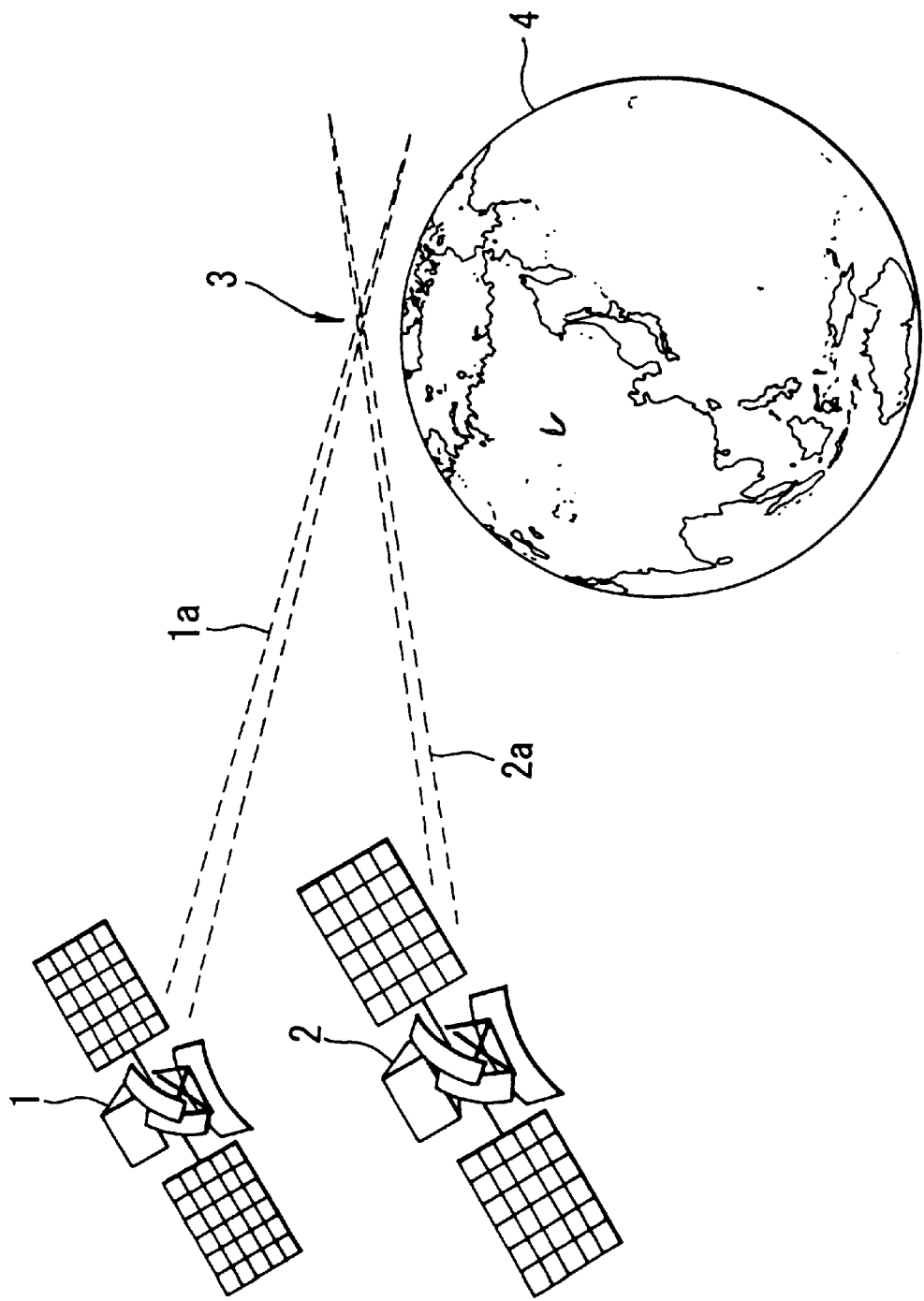
FIG. 1 is a conceptual diagram showing the manner of observing a specified space near the earth from two units of satellites in an embodiment of the system for spotting moving objects based on a plurality of artificial satellite according to the present invention.
Figure 2:
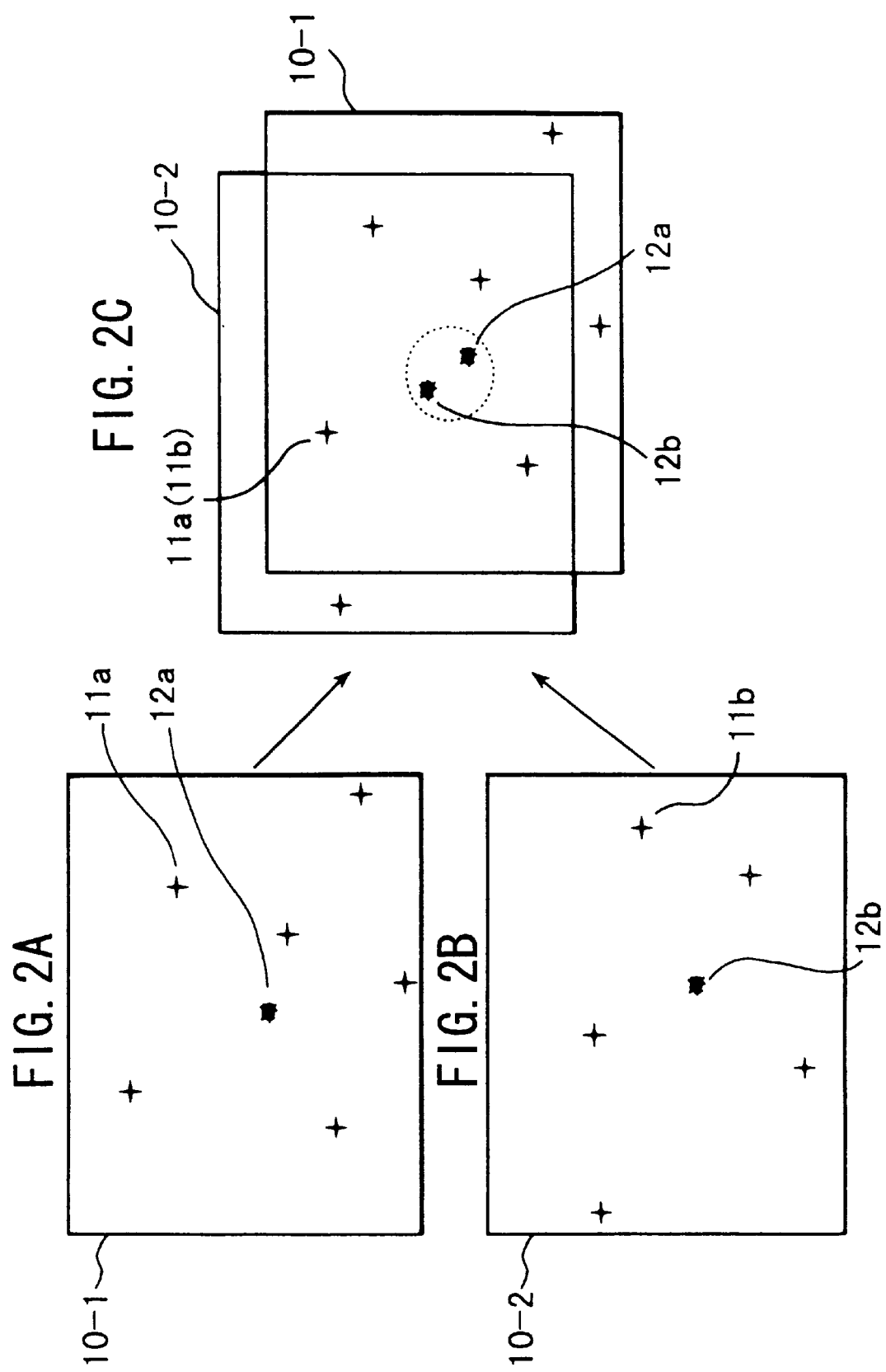
FIGS. 2A–2C illustrates the principle according to which a moving object can be discriminated from the fixed stars through a synthesis of two light spot images taken simultaneously from two satellites.

A description will be given below with respect to an embodiment of the present invention. FIG. 1 is a conceptual diagram showing an exemplary embodiment of the system for spotting moving objects based on a plurality of artificial satellites according to the present invention, showing the manner of observing a specified space near the earth from two satellites. FIGS. 2A to 2C illustrate the principle according to which a moving object can be discriminated from the fixed stars through a synthesis of two light spot images taken simultaneously from two satellites.

First, in order to explicitly illustrate an embodiment of the present invention, space debris orbiting in space near the earth at an altitude of less than 1,000 km is selected as the subject to be observed. It is supposed as shown in FIG. 1 that two units of satellites, first and second satellites 1, 2, disposed in a series along a sun synchronous orbit, for example, at an altitude of about 1,000 km are orbiting between sunlit and shaded space.

Since the debris located above the horizon when viewing the shaded side from the satellites 1, 2, is caused to illuminate as glittered by the sun, the optical observation paths (imaging direction vectors) 1a, 2a of the two satellites 1, 2 are preferably pointed to such directions that they cross each other above the horizon. By consecutively taking images of the space above the horizon while maintaining such attitude, discrimination is consecutively performed of the light spot of debris from the light spots of fixed stars so as to allow a measurement of the position vector of debris. It should be noted that, in FIG. 1, numeral 3 denotes the space to be observed and 4 denotes the earth.

Two light spot images 10-1, 10-2 simultaneously taken by the two satellites 1, 2, if their imaging direction vectors are substantially in the same direction, include identical fixed star patterns 11a, 11b and light spots 12a, 12b of a moving object as shown in FIGS. 2A, 2B. By synthesizing these two light spot images 10-1, 10-2, so as to cause a coincidence of the fixed star patterns 11a, 11b, only the light spots 12a, 12b of the moving object are shifted from each other and left without causing an overlap as shown in FIG. 2C. Hence, the moving object can be extracted from the taken light spots. It should be noted that a verification as to whether or not the light spots 12a, 12b are of the same moving object can be made by checking if the same orbital elements around the earth are satisfied by the position data in time series obtained by a plurality of times of observation.

In the case where identical fixed star patterns cannot be obtained within the light spot images taken from the two satellites, fixed star patterns respectively in the vicinity of the taken images are first formed based on the internally stored catalog fixed star data as previously shown as the second aspect of the present invention. Nonregistered fixed stars and moving objects are then specified by synthesizing the taken light spot images and the above formed fixed star patterns. Furthermore, images of the same space are taken with providing an intervening time difference of several seconds to several tens of seconds and the nonregistered fixed stars and moving objects are similarly specified. Since, at this time, only the moving objects are moved with respect to the catalog fixed stars in accordance with the passage of time, a distinction can be made between the nonregistered fixed stars and the moving objects. Since a moving object can be separated from nonregistered fixed stars by thus using light spot images that have been taken with a time difference, it is conversely possible to specify nonregistered fixed stars and to compute their direction vectors. Hence, the data of catalog fixed stars can be updated and improved while in operation.

Figure 3:
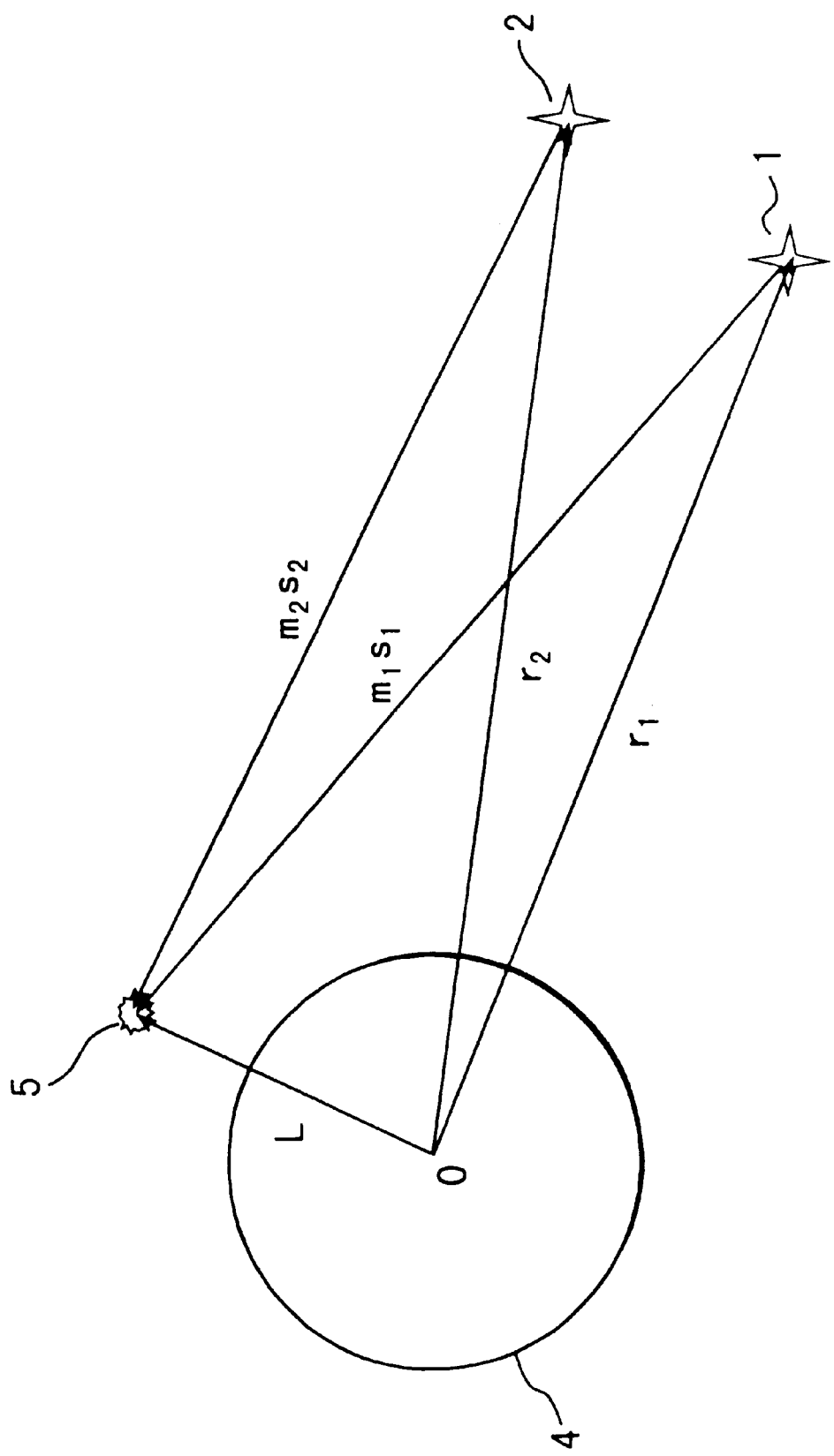
FIG. 3 shows a geometric relationship between a moving object to be observed and two satellites on which the imaging devices are located.

The position of a moving object extracted by a synthetic processing as described above can be computed from a geometric relationship between a reference fixed star pattern and the light spot of the moving object. FIG. 3 is an exemplary illustration of how to define the geometric relationship among the moving object to be observed and the two satellites 1, 2 on which the imaging devices are located. In the system for spotting moving objects based on a plurality of satellites according to the present invention, position vector L of a subject to be observed (moving object) 5 originated at the earth's center O is obtained by observation from the plurality of satellites and, in addition, the orbit of the moving object 5 can be determined by observing such position vector for a plurality of times.

Direction vector $m_i=(i=1, 2)$ of the moving object (debris) 5 can be computed by a generally known numerical computation upon a measurement of the geometric relationship between the light spot of the moving object 5 and the catalog fixed stars. Since the moving object 5 is at a finite distance, the direction vectors obtained at the two satellites 1, 2 of the moving object 5 are of the different values from each other. It is supposed, as shown in FIG. 3: $m_1$, $m_2$ as the direction vectors of direction toward the subject to be observed from the two satellites 1, 2, respectively; $S_1$, $S_2$ as the ranges thereof, respectively; and $r_1$, $r_2$ as the position vectors of the satellites 1, 2, respectively. Then, the position vector L of the moving object (debris) is expressed by the following equation (1).

$$L = r_i + s_i m_i (i=1, 2) \qquad (1)$$

By applying the definition of the above equation (1) and supposing $s_{i0}$ as the value before update of the range $s_i$, an equation for obtaining an increment $\delta s_i$ from $s_{i0}$ is given by the following equation (2).

$$(m_1 - m_2)\begin{pmatrix} \delta s_1 \\ \delta s_2 \end{pmatrix} = (-s_{10}m_1 + s_{20}m_2 - r_1 + r_2) \qquad (2)$$

Accordingly, updating of $s_i$ can be performed by the following equation (3).

$$\left. \begin{array}{l} \begin{pmatrix} s_1 \\ s_2 \end{pmatrix} = \begin{pmatrix} s_{10} \\ s_{20} \end{pmatrix} + (H^T H)^{-1} H^T \delta z \\ H = (m_1 - m_2) \\ \delta z = (-s_{10}m_1 + s_{20}m_2 - r_1 + r_2) \end{array} \right\} \qquad (3)$$

where: H is an observation matrix; and $\delta z$ is a deviation vector computed from the range before update and the measured direction vector.

Although there may be a significant error in updating by the above equation (3) if the value of $s_{io}$ before update is greatly deviated from the actual value of $s_i$, an appropriate converging value is generally obtained by repeated updates using the above equation (3).

The distance $s_i$ between the satellite and the debris, an unknown in the above equation (1), can thus be obtained. The direction vector $m_i$ obtained from the geometric relationship between the light spot of the moving object 5 and the catalog fixed stars and the satellite's position vector $r_i$ are substituted to obtain the position vector L of the moving object 5.

Figure 4:
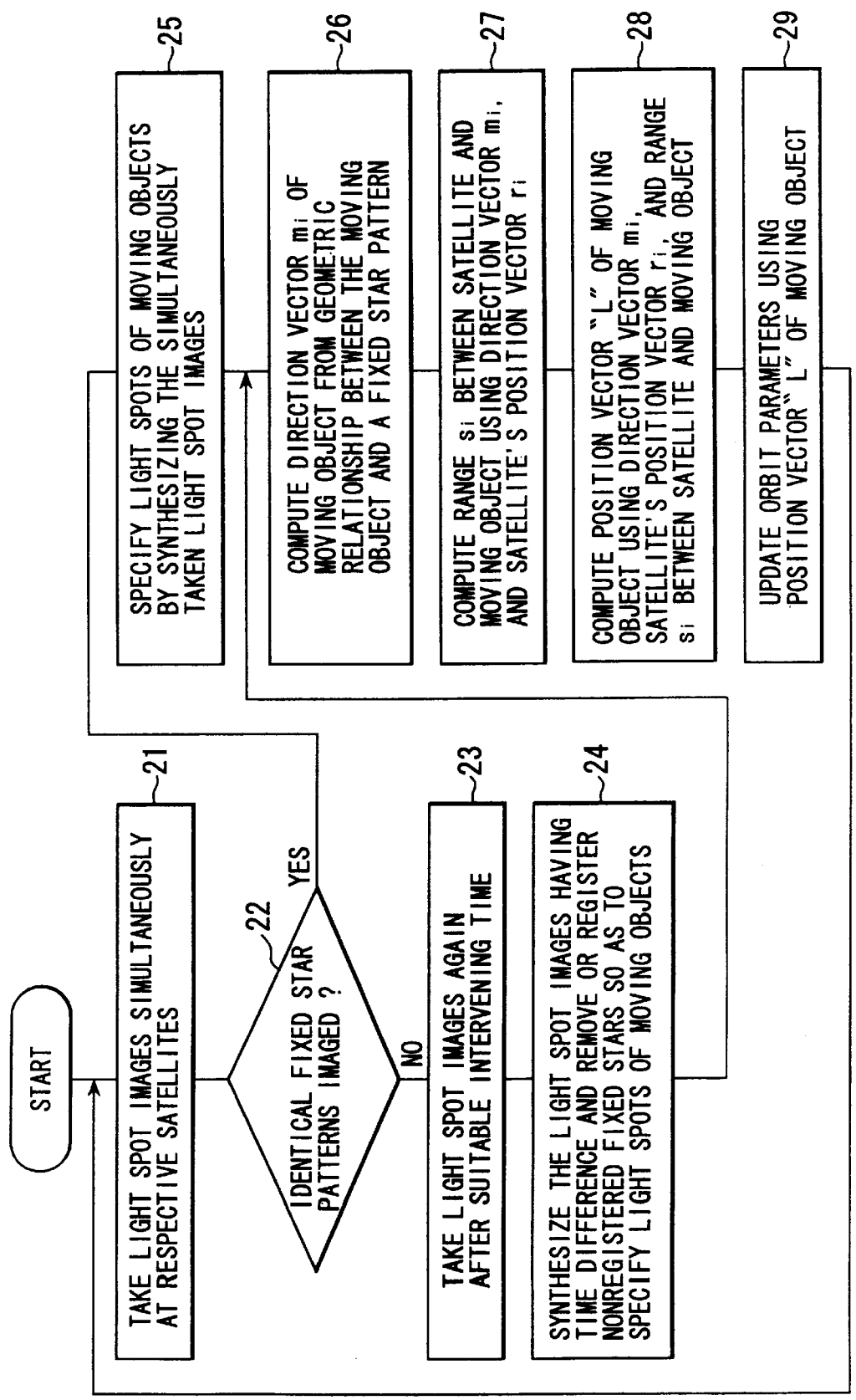
FIG. 4 is a flowchart showing the procedure of data processing up to a determination of the position and orbit of a moving object in a system for spotting moving objects based on a plurality of artificial satellites according to the present invention.

An example is shown in FIG. 4 of data processing flow from the taking of light spot images by the two satellites up to a computation of the position of a moving object (debris) and an estimation of the orbit of the moving object (debris). First, images of light spots are taken at the same point in time at the respective satellites (step 21). It is then determined whether identical fixed star patterns exist within the two light spot images taken at the respective satellites (step 22); if identical fixed star patterns do not exist, light spot images are taken again after a suitable time difference (step 23); and the light spots of the moving objects are discriminated from the light spots of the fixed stars (catalog fixed stars and nonregistered fixed stars) through a synthetic processing of the light spot images taken by the same one satellite (step 24). If identical fixed star patterns exist at the determination in step 22, the light spots of the moving objects are discriminated from the light spots of the fixed stars by synthesizing the light spot images taken by the two satellites (step 25).

Upon discrimination of moving objects as described, it becomes possible to obtain a geometric relationship between the light spot of a moving object and a fixed star pattern. The direction vector $m_i$ of the moving object is then computed from such geometric relationship (step 26). The direction vector $m_i$ and the satellite's position vector $r_i$ are then used to obtain range si between the satellite and the moving object based on the equation (3) (step 27). The direction vector $m_i$, the satellite's position vector $r_i$ and the range $s_i$ between the satellite and the moving object are then used to compute position vector L of the moving object based on the equation (1) (step 28), so as to determine the position of the moving object. The position vectors L obtained consecutively of the moving object are then used to update the six obit parameter elements (semimajor axis, a; eccentricity, e; orbit's inclination, i; right ascension of the ascending node, Ω; argument of perigee ω; mean anomaly, M) of the moving object (debris) (step 29), so as to determine the orbit of the moving object. In doing so, they are updated by using a Kalman filter for example every time when a position vector of the moving object is computed.

While the above embodiment has been described with respect to a technique for computing an orbit by specifying the position of a moving object using imaging devices mounted on two units of satellites, it is also possible in the present invention to use imaging devices mounted on three or more units of satellites, in which case there is an advantage of higher accuracy in determining the range $s_i$ between the satellites and the moving object.

As has been described by way of the above embodiment, the position of moving objects such as debris can be consecutively measured according to the present invention by specifying and imaging a subject space of observation from an orbit of artificial satellite where conditions for optical observation are favorable. Accordingly, it becomes possible to efficiently determine or update the orbital elements of a large number of moving objects which cannot be observed from the earth. Particularly, in accordance with the first aspect of the present invention, the positions of moving objects are determined by taking images at the same point in time of substantially the same direction from at least two units of satellites that are orbiting closely to each other. The moving objects can be readily specified even in the case of relatively small amount of data of reference fixed stars, though the accuracy in spotting a moving object is degraded with the increase in its distance.

Further, in accordance with the second aspect of the present invention, since the position is determined by performing at least two times of image taking with providing a time difference, an overlapping of the skies to be imaged by the two units of satellites is not required though the synthetic processing of light spot images becomes complicated. For this reason, a space to be observed can be selected with relatively less restrictions so as to eliminate geometrical degradation in spotting accuracy. Furthermore, in accordance with the third aspect of the present invention, the plurality of artificial satellites to be used are injected into almost identical sun synchronous orbits with shifting the time of passing the ascending node. Moving objects such as debris can be observed uniformly and thoroughly. In addition, it is possible to perform observation of such moving objects as minute debris which cannot be achieved by the conventional techniques, by maintaining a geometric relationship among the sun, the satellites and the moving objects so as to attain a maximum luminance of moving objects such as debris.

What is claimed is:

1. A system of spotting moving objects based on a plurality of artificial satellites, comprising:

a step of taking images at the same point in time by using imaging devices respectively mounted on at least two units of artificial satellites located separately from one another of which the positions can be defined at every moment in time;

a step of discriminating a large number of stars at infinity and a small number of moving objects located near the earth through a synthetic processing by superimposing upon another at least two images of light spots obtained from the image taking at the respective satellites; and a step of specifying the positions of said discriminated moving objects from data of images forming positions of the moving objects based on said large number of stars at infinity.

2. A system for spotting moving objects based on a plurality of artificial satellites, comprising:

a step of taking images at the same point in time for a plurality of different points in time by using imaging devices respectively mounted on at least two units of artificial satellites located from one another of which the positions can be defined at every moment in time;

a step of discriminating a large number of stars at infinity and a small number of moving objects located near the earth through a synthetic processing of a plurality of light spot images obtained from said image taking at respective satellites; and a step of specifying the positions of said discriminated moving objects from data of images forming positions of the moving objects based on said large number of stars at infinity.

3. The system for spotting moving objects based on a plurality of artificial satellites according to claim 1, wherein said plurality of artificial satellites are injected into substantially a same sun synchronous orbit such that space near the earth can be comprehensively observed under a same image taking environment.

4. The system for spotting moving objects based on a plurality of artificial satellites according to claim 2, wherein said plurality of artificial satellites are injected into substantially a same sun synchronous orbit such that space near the earth can comprehensively observed under a same image taking environment.

* * * * *